March 6, 1956   C. M. BOYLE   2,736,969
VERNIER CENTERING GAUGE
Filed June 25, 1953

INVENTOR
C M Boyle
Arthur H. Sturges
ATTORNEY

United States Patent Office 2,736,969
Patented Mar. 6, 1956

2,736,969

VERNIER CENTERING GAUGE

Charles M. Boyle, Kimball, Nebr.

Application June 25, 1953, Serial No. 364,013

4 Claims. (Cl. 33—189)

This invention relates to punches for marking the positions of holes to be drilled in metal and more particularly it is an object of the invention to provide a punch assembly for the punching of centering recesses in rounded material which is later to have holes drilled therethrough at the recesses.

In machine shop work, it is frequently necessary to make a series of aligned punched recesses in a round shaft. It is very difficult and time consuming to do this punching accurately, and quickly.

It is, therefore, an object of this invention to provide a punch aligning device for use in conjunction with a punch, whereby a row of perfectly aligned marks or recesses can be made in a shaft without the use of other alignment tools.

A further object of the invention is to provide a level-vial-and-punch-guide assembly which is provided with divergent legs for engaging opposite side portions of a shaft which is circular in cross section to support the assembly during operation.

Another object of the invention is to provide a centering gauge and punch assembly having a level vial mounted thereon which is mounted in combination with a vernier scale for accurate measuring, so that the vial may be easily and quickly adjusted perpendicular to the shaft.

Another object of the invention is to provide an assembly having legs as described in which the legs are provided with means for engaging an object known to be level so that the vial can be rotatably adjusted with respect to the legs and with respect to the punch.

Still another object of the invention resides in the provision of an assembly as described in which a punch is returned to a normally retracted position following the punching blow.

Another object of the invention is to provide an assembly as described in which a level vial is rotatably disposed in a mounting and a vernier scale is provided on the mounting. The vernier scale is preferably marked in units of degrees and is employed cooperatively with the level vial member and the remainder of the punch assembly in that by adjusting the lines of marking on the scale any number of degrees as desired the bubble of the vial will be offset an equal number of degrees. When the device is now located on the shaft and the bubble of the vial located in a level position it will be seen that the punch of the assembly will be offset the desired number of degrees as it was set on the vernier scale.

Yet another object of the invention is to provide a device for the purposes described which is sturdy and durable in construction, reliable and efficient in operation, and relatively simple and inexpensive to manufacture, assemble and utilize.

Another object of this invention is to provide an improvement in the centering gauge described in the applicant's patent application titled "Centering Gauge," filed June 30, 1949, application Serial No. 102,319, now abandoned.

Other and still further objects and advantages of the invention will become apparent from the following detailed description and preferred embodiment thereof.

Figure 1:
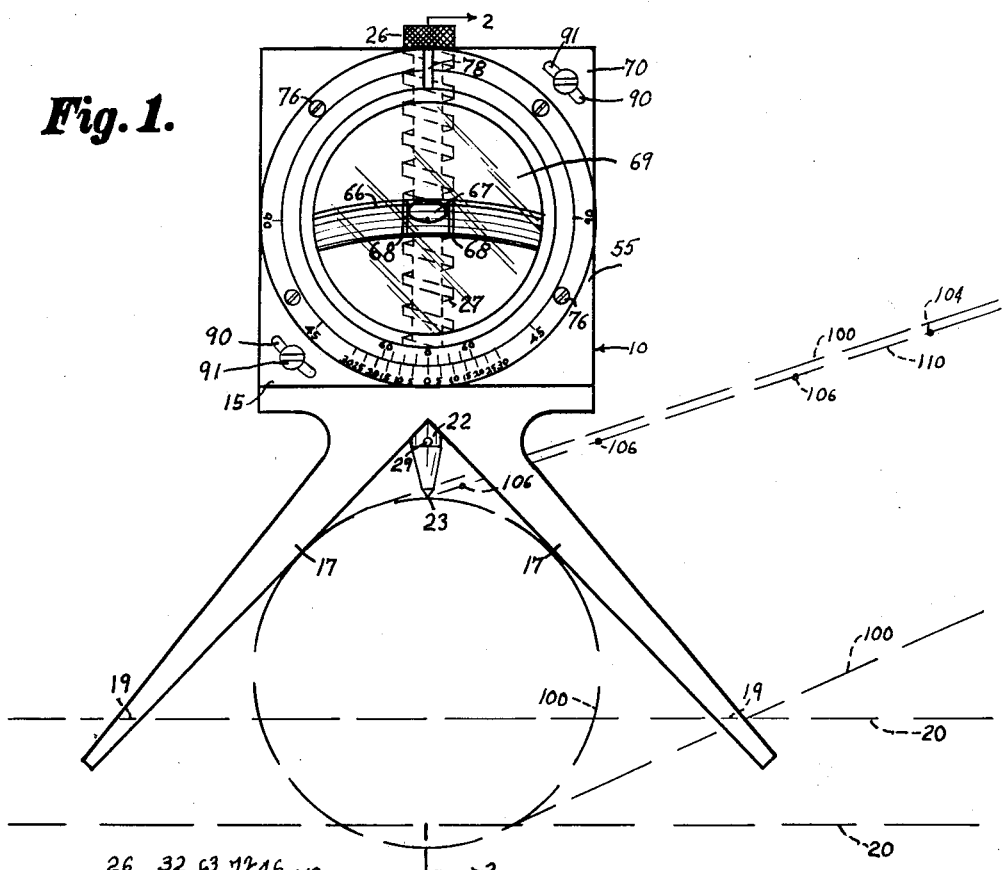
Figure 1 is a frontal elevation of the punch assembly of the invention shown as disposed in operating position across a shaft, the latter, together with an imaginary line marked by previous punch marks all being shown in dotted lines; a member known to be level is shown on which the assembly may be upheld for adjusting the level vial.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10, refers to the invention in its entirety, and the latter includes a main body portion 15 having two divergent legs 17 extending downwardly and outwardly therefrom.

Each leg 17 is provided with a slot 19 in its lower end portion for the purpose of receiving a flat elongated member indicated in dotted lines at 20 at certain times for the purpose of checking and adjusting the assembly before it is employed in actual use.

The main body portion or mounting plate 15 is provided with a bore 21 extending downwardly therethrough with its axis bisecting the right angle formed by the straight undersides of the legs 17.

The purpose of the bore 21 is for snugly but slidably receiving the elongated cylindrical shank of a centering punch 22. The punch 22 has a pointed lower end 23 and extends upwardly through the bore 21, having an upper end 26 larger than the bore 21 and also larger than the diameter of the coiled spring 27 for which it acts as a retainer. The spring 27 is disposed between the head end 26 and a rearwardly protruding ledge 28 of the main body portion 15. The spring 27 is coiled about the shank of the punch 22 and is of a proper length to maintain the punch 22 in what will be referred to as a retracted position.

A detent 29 extends through the lower end of the punch 22 and engages the inner surface of a recess 30 to halt retraction of the punch 22.

The main body portion 15 has an upwardly extending face portion 32 disposed forwardly of, and across the front of the punch 22. The face portion 32 has a flat forward surface disposed in a plane of parallelism with the punch 22 and with the slots 19.

A housing 55 is provided, being preferably square in frontal elevation. At least two of the corners 70 of the housing 55 are provided with arcuate shaped apertures 90 therethrough, each aperture being in the position of a segment of a circle having its center at the center of the housing 55. Screws 91 are disposed through the apertures 90 and are threadedly attached to the face portion 32.

The housing 55 has an outwardly extending circular wall 63, having an inner circular surface 64. A ring 65 is inserted therein with its outer surface adjacent and snugly but slidably disposed against the inner surface of the ring 63.

A level-vial 66 is provided within the ring 65. The vial 66 has an arcuate shape and is partially filled with liquid for creating a bubble 67 therein. The vial 66 is provided with two spaced apart circumferential markings 68 adjacent the center thereof. The ends of the vial 66 are suitably attached to opposite sides of the ring or vial holding member 65.

The ring 65 is step cut along its inner surface forming a shoulder 68 to which a transparent window 69 may be attached by a suitable cementitious material 70'.

The outer surface of the ring 65 is similarly step cut for providing a recess with a shoulder 71 against which retaining ring 72 is preferably attached by a plurality of screws 76. The ring 72 overlaps the ring 65.

Figure 2:
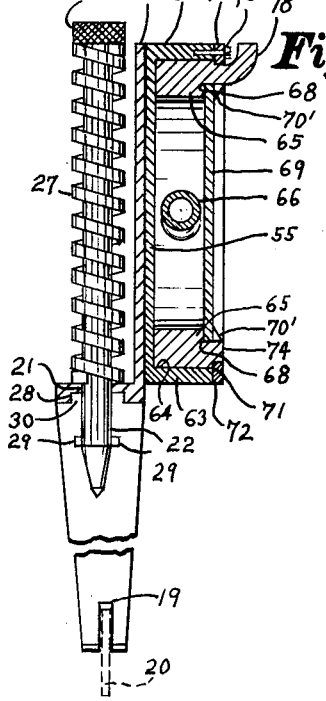
Figure 2 is a cross sectional view of the assembly in Figure 1 taken along the dotted line 2—2 and looking in the direction of the arrows.
Figure 3:
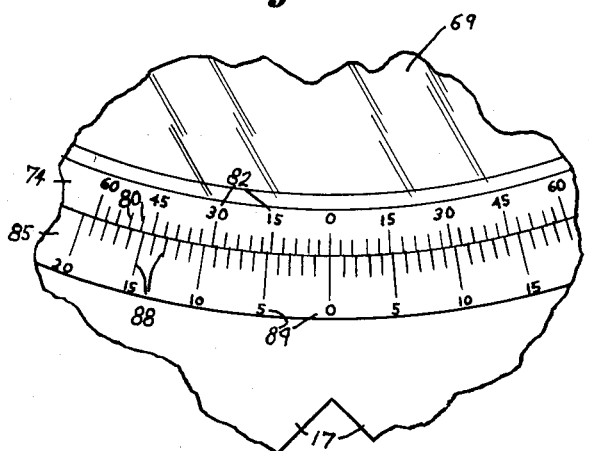
Figure 3 is an enlarged fragment of the vernier scale depicted in Figure 1.

As best seen in Figure 2, the ring 65 has an exposed surface 74. A handle 78 is formed integral with the ring 65, extending upwardly and outwardly from the surface 74 of the ring 65 for rotatably turning the ring 65 within the ring 72.

The surface 74 is also provided with a vernier scale having spaced markings 80 and numerals 82. The retaining ring 72 similarly has an exposed outer surface 85, and graduations are provided thereon having spaced degree markings 88 and numerals 89.

The markings 82 preferably go to the right and to the left of a 0 point in numerals having a difference of 15 and from 0 to 60, representing minutes. Between the longer markers at the numerals are four shorter markers 80 equidistantly spaced apart with respect to each other. Each marker 80 represents three minutes.

The numerals 89 represent degrees around the circumference of the surface 85. The numerals 89 read from 0 to 90 on either side of the 0 point. The numerals 89 may be optionally spaced as often as desired and but a portion of the scale is minutely subdivided for purposes of illustration.

Thus, the scale of the surface 85 is shown in the drawing as graduated into numerals 89 differing from each other in units of 5 degrees from 0 to 30, although the remainder of the scale is shown only by 45 and 90 degree markers. Between the longer markers at 5 degree intervals a plurality of smaller markers are provided, preferably four in number each representing a degree.

In operation, the ring 65 is placed with a 0 point opposite the 0 point of the scale surface 85. The member 70 is then adjusted with respect to the housing 63 by loosening the screws 91. The gauge is then placed upon the level member 20 with the latter received in the slots 19.

As previously described, the slots 19 are so positioned that their upper walls are disposed against the upper edge of the member 20 at times when the punch 22 is vertically disposed.

The screws 91 are now tightened in a position for holding the bubble 67 in level position between the markers 68. The gauge is now ready for use.

During use the screws 91 are not adjusted further. The device is placed across the top of a round shaft such as is indicated at 100 and while the shaft 100 is held stationary, the device is adjusted to a position in which the bubble is level. A hammer blow is then struck on the punch 22 for forming a recess 104 in the shaft 100.

Other recesses 106 can be punched in a line 110 by holding the shaft stationary, shifting the guide lengthwise of the shaft and punching the recesses 106 only at times when the bubble 67 is in level position.

Other recesses can be made in the shaft 100 at desired angles about the circumference of the shaft with respect to the recesses 106 by adjusting the 0 point of the scale surface 74 opposite the desired degree on the scale surface 85. The device is then moved round the circumference of the shaft until its bubble 67 is again level, the shaft being held stationary meanwhile. The desired recess is then punched.

When such an angle is defined in minutes as well as degrees, the scale 74 is rotated with its 0 point the desired distance past the closest lesser degree mark until the desired minute marker is in alignment with one of the degree markers. The recess can then be formed after adjusting the device to level position.

It will be seen that minutes could also be determined by further calibrating the scale surface 85. This would be less satisfactory however because the markings would be too minute to be readable and only a very few minute markers could be placed in such a position.

It will be further seen that the scales on the surfaces 74 and 85 can be interchanged if desired and the 0 point on the scale surface 74 provides a stationary marker, in a sense, about which the scale surface 85 and the remainder of the device can be rotated.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Having now described the invention that which is claimed to be new and desired to be procured by Letters Patent is:

1. A centering gauge assembly comprising: a main body portion having a bore therethrough; a punch member having an elongated shank snugly and slidably disposed through said bore; resilient means for urging said punch toward a normally retracted position; means for maintaining said punch in said bore; a level vial, said vial being partially filled with liquid for providing a bubble therein, said vial having at least one centering marker thereon; a vial holding member, said vial holding member having a circular exterior; a vernier scale on said vial holding member; a stationary marker for cooperation with said scale; means for maintaining said stationary marker opposite said scale and in fixed position with respect to said main body portion; a housing member having a circular center recess for snugly and slidably receiving said vial holding member, said recess being disposed in a plane in parallelism with said punch, said housing member having two slots therethrough on oppositely disposed edge portions thereof; screws slidably disposed through said slots and threadedly received in said main body portion; and means for maintaining said vial holding member in said recess.

2. A centering gauge assembly comprising: a main body portion having a ledge with a bore therethrough extended from the lower portion; a punch member having an elongated shank snugly and slidably disposed through the bore of said ledge; resilient means for urging said punch toward a normally retracted position; means for maintaining said punch in said bore; a level vial, said vial being partially filled with liquid for providing a bubble therein, said vial having at least one centering marker thereon; a vial holding member having an annular recess in the outer edge; a ring mounted on said main body portion and extended into the annular recess of the vial holding member for rotatably securing said vial holding member to said main body portion in a manner for rotation of said vial holding member with respect to said main body portion in a plane in parallelism with said punch member; a vernier scale on said vial holding member; a second scale calibrated differently than said first scale;

and means for maintaining said second scale opposite said first-mentioned scale and in fixed position with respect to said main body portion.

3. A centering gauge assembly comprising: a main body portion having a ledge with a bore therethrough extended from the lower part; a punch member having an elongated shank snugly and slidably disposed through said bore; a spring extended around the punch member and seated on said ledge for urging said punch toward a normally retracted position; means for maintaining said punch in said bore; a level vial, said vial being partially filled with liquid for providing a bubble therein, said vial having at least one centering marker thereon; a vial holding ring having an annular recess in the peripheral edge; a retaining ring secured to the main body portion and extended into the recess of the vial holding ring for rotatably securing said vial holding ring to said main body portion in a manner for rotation of said vial holding ring with respect to said main body portion in a plane in parallelism with said punch member; a vernier scale on said vial holding ring; a stationary marker for cooperation with said scale; and means for maintaining said stationary marker opposite said scale and in fixed position with respect to said main body portion.

4. In a centering tool, the combination which comprises a mounting plate having a ledge on the lower edge with right angularly disposed diverging legs extended downwardly from the ledge, and said ledge having a bore, the axis of which bisects the angle between the legs, a punch having a head on the upper end slidably mounted in said bore, resilient means positioned around the punch for urging the punch upwardly, a pin in the lower end of the punch and positioned to engage the ledge for limiting upward movement thereof, a housing having an outwardly disposed circular wall positioned on said mounting plate, a ring rotatably mounted in the circular wall of the housing, a bubble glass carried by said ring and adapted to be positioned in a plane substantially perpendicular to the axis of the punch, and a transparent panel positioned in the outer portion of the ring said ring having a vernier scale thereon and having a handle for adjusting the position thereof extended from the upper portion, and said circular wall of the housing having a coacting scale thereon.

References Cited in the file of this patent

UNITED STATES PATENTS

| | | |
|---|---|---|
| 742,077 | Sovelius | Oct. 20, 1903 |
| 777,641 | Knighton | Dec. 13, 1904 |
| 1,063,342 | Ekman | June 3, 1913 |
| 1,370,645 | Hawkes | Mar. 8, 1921 |
| 1,424,941 | Pirwitz | Aug. 8, 1922 |
| 1,927,504 | Rudolff | Sept. 19, 1933 |
| 2,113,524 | Wolfe | Apr. 5, 1938 |
| 2,129,695 | Karnes | Sept. 13, 1938 |
| 2,531,077 | Mullin | Nov. 21, 1950 |
| 2,565,262 | Parks | Aug. 21, 1951 |